United States Patent
Kusaba et al.

(10) Patent No.: US 8,895,170 B2
(45) Date of Patent: Nov. 25, 2014

(54) BATTERY HOLDER

(71) Applicants: Toyoda Gosei Co., Ltd., Kiyosu (JP); Toyota Jidosha Kabushiki Kaisha, Toyota (JP)

(72) Inventors: Kosuke Kusaba, Kiyosu (JP); Yasunori Uchida, Kiyosu (JP); Shinichi Takeda, Kiyosu (JP); Takeshi Hattori, Kiyosu (JP); Kenji Kimura, Miyoshi (JP)

(73) Assignees: Toyoda Gosei Co., Ltd., Aichi-pref. (JP); Toyota Jidosha Kabushiki Kaisha, Toyota-shi (JP)

( * ) Notice: Subject to any disclaimer, the term of this patent is extended or adjusted under 35 U.S.C. 154(b) by 129 days.

(21) Appl. No.: 13/786,908

(22) Filed: Mar. 6, 2013

(65) Prior Publication Data

US 2013/0236759 A1 Sep. 12, 2013

(30) Foreign Application Priority Data

Mar. 9, 2012 (JP) .................................. 2012-52818

(51) Int. Cl.
*H01M 2/10* (2006.01)

(52) U.S. Cl.
CPC .......... *H01M 2/1016* (2013.01); *H01M 2/1072* (2013.01); *H01M 2/1022* (2013.01); *H01M 2/1077* (2013.01); *H01M 2200/00* (2013.01)
USPC ............................................ 429/99; 429/120

(58) Field of Classification Search
CPC .......... H01M 2/1077; H01M 10/5004; H01M 2/1072; H01M 2200/00; H01M 2/1016; H01M 2/1022
USPC ..................................................... 429/99, 120
See application file for complete search history.

(56) References Cited

U.S. PATENT DOCUMENTS

| | | | | |
|---|---|---|---|---|
| 8,389,145 | B2 * | 3/2013 | Graban et al. | 429/120 |
| 8,557,429 | B2 * | 10/2013 | Hamada et al. | 429/153 |
| 8,790,810 | B2 * | 7/2014 | McLaughlin et al. | 429/120 |
| 2008/0124622 | A1 * | 5/2008 | Hamada et al. | 429/149 |
| 2010/0291428 | A1 * | 11/2010 | Graban et al. | 429/120 |
| 2013/0157098 | A1 * | 6/2013 | McLaughlin et al. | 429/120 |

FOREIGN PATENT DOCUMENTS

| | | |
|---|---|---|
| JP | 2008-140629 A | 6/2008 |
| JP | 2010-009798 A | 1/2010 |

* cited by examiner

*Primary Examiner* — Stewart Fraser
(74) *Attorney, Agent, or Firm* — Posz Law Group, PLC

(57) ABSTRACT

A battery holder is equipped with a support unit having a battery holding hole, and a holder unit interposed between the battery holding hole and the battery. The holder unit has a first spacer and a second spacer. The first spacer has a support part that supports the battery in the support unit. The second spacer is formed using a material with a lower melting point than the melting point of the material of the first spacer, this is inserted in the heat shielding space, and when the second spacer is melted by heat and flows out from the heat shielding space, the constitution is such that the heat shielding space shifts the heat insulation space.

15 Claims, 6 Drawing Sheets

BATTERY HOLDER

This application claims the benefit of and priority from Japanese Application No. 2012-52818 filed Mar. 9, 2012, the content of which is incorporated herein by reference.

BACKGROUND OF THE INVENTION

1. Field of the Invention

The present invention relates to a battery holder for holding a plurality of batteries.

2. Description of the Related Art

Batteries holders are disclosed in JP 2008-140629A and JP 2010-9798A. The battery holder in JP 2008-140629A arranges a heat insulating member between a plurality of batteries. Other battery holder in JP 2010-9798A has a constitution for which a cylindrical battery is held in a resin holder with high insulating properties. In a plurality of batteries arranged in close proximity, if a portion of the batteries has high heat emission occur, the heat affects the other normal batteries, and there can be a chain reaction of damage to the other normal batteries. To prevent the damage, the battery holders arrange an insulating material or a resin holder with high insulating properties between batteries, preventing a chain reaction of damage from occurring with a plurality of batteries.

However, with the insulating material or resin holder, it is easy for a large temperature difference to occur between a plurality of batteries, and there are cases when that state is maintained over a long period. The life of a battery depends on that temperature, and when a high temperature is maintained over a long term for a portion of the batteries, the batteries for which the high temperature was maintained have a shorter life than the other batteries. Because of this, with a battery holder that holds a plurality of batteries, there was the problem that it was necessary to replace all of the plurality of batteries even though a portion of the batteries has not used up their life.

SUMMARY

An advantage of some aspects of the invention is provided with a battery holder for holding a plurality of batteries, if a large temperature rise occurs with a portion of the batteries, to prevent a chain reaction temperature rise in the other batteries, and also lengthens the life of all of the plurality of batteries.

According to an aspect of the invention, the invention provides with a battery holder for holding a plurality of batteries. The holder comprises: a support unit having battery holding holes for inserting each battery, and a holder unit interposed between an outer surface of the battery and an inner surface of the battery holding hole for supporting the battery in the support unit. The holder unit includes a first spacer and a second spacer interposed to be laminated between the battery and the battery holding hole. The first spacer is made of a first material, and has a support part for supporting the battery in the support unit so as to form a heat shielding space between the outer surface of the battery and the inner wall of the battery holding hole, and the second spacer is made of a second material that has a lower melting point than the melting point of the first material, and inserted in the heat shielding space. The second spacer is configured to shift the heat shielding space into a heat insulation space when the second spacer melts by heat, and the melted second spacer flow out from the heat shielding space.

The battery holder noted in the application example holds the batteries with a support unit via a holder part. The holder part is equipped with a first spacer and a second spacer, and the second spacer is formed using a material with a lower melting point than the melting point of the material of the first spacer. Even if the temperature of a portion of the batteries held by the battery holder becomes high, when the temperature is the melting point of the second spacer material or lower, the battery heat goes through the second spacer and the first spacer and is transmitted gradually to the support unit. By doing this, the temperature of the other batteries becomes almost the same temperature, and heat radiation occurs mainly at the support unit. Thus, it is possible to suppress a rise in temperature with only a portion of the batteries, and to realize longer life of the plurality of batteries.

Also, when the temperature of a portion of the batteries rises to exceed the melting point of the material of the second spacer, the second spacer melts, and a heat insulation space with high insulating performance is formed. In this way, even when one battery exceeds a designated temperature, the heat insulation space with high insulating performance is formed, so the other batteries are not greatly affected by the heat, and a chain reaction temperature rise does not easily occur.

(2) With the battery holder of another application example, the first spacer is equipped with a round cylinder shaped core main body which fits and holds the battery, the second spacer is laminated on the outer circumference surface of the core main body and is arranged so as to contact the inner wall of the battery holding hole, and the support part is provided projecting from a portion of the outer circumference surface of the core main body, and abuts the inner wall of the battery holding hole. Using this constitution, the core main body supports the battery by abutting its outer surface, so even if the second spacer melts and constitutes the heat insulation space, it is possible to held the battery firmly.

(3) With another application example, the constitution is such that the first spacer is equipped with a round cylinder shaped core main body which is fitted in the inner wall of the battery holding hole, the second spacer is laminated on the inner circumference surface of the core main body, and arranged so as to contact the outer surface of the battery, and the support part is provided projecting from a portion of the inner circumference surface of the core main body, and abuts the outer surface of the battery. With this constitution, when the second spacer melts, it forms the heat insulation space with the outer surface of the battery, so it is possible to increase the insulating properties.

(4) Another application example is a battery holder for which the second spacer is equipped with a slit fitted to the support part. With this constitution, the first spacer and the second spacer are fitted via the support part and the slit, so it is possible to strengthen the link of the first spacer and the second spacer and to increase their alignment.

(5) Another application example is a battery holder for which the support part is a protrusion provided projecting along the axis direction of the core main body.

(6) Another application example is a battery holder for which the second spacer is formed using a material for which the thermal conductivity is higher than the thermal conductivity of the material of the first spacer. With this constitution, the second spacer more quickly transmits the heat of the battery before melting, promoting more uniformity of the battery temperatures.

(7) The support unit of another application example is equipped with first and second blocks that form the battery holding hole, and the battery holder is constituted such that a gap is formed between the first block and the second block, and when the second spacer is melted by heat, that gap has melted resin flow into it and the heat insulation space is formed. With this constitution, it is possible to easily constitute a location to which the material melted by the first spacer flows easily.

These and other objects, features, aspects, and advantages of the present invention will become more apparent from the following detailed description of the preferred embodiments with the accompanying drawings.

DESCRIPTION OF THE PREFERRED EMBODIMENTS (1) Schematic Structure of Battery Holder 10

Figure 1:
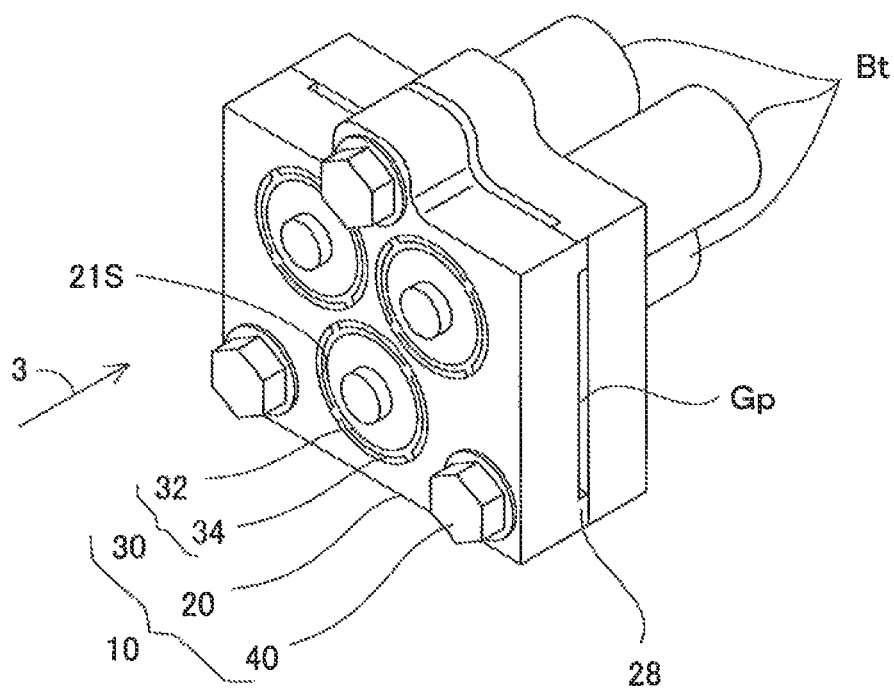
FIG. 1 is a perspective view showing a state with the batteries held by the battery holder of the first embodiment of the present invention.

FIG. 1 is a perspective view showing a state with batteries Bt held by a battery holder 10 of the first embodiment of the present invention. The battery holder 10 is a mechanism for holding the plurality of batteries Bt (three in FIG. 1). The battery Bt is a cylindrical general purpose battery, for example a lithium ion battery used for an automobile power supply can be used. The battery holder 10 is equipped with a support unit 20 having a battery holding hole 21S for respectively inserting a plurality of batteries Bt, holder parts 30 interposed between the battery holding holes 21S and the batteries Bt, and fastening members 40 for fastening the support unit 20. Following, we will describe the constitution of each part.

(2) Constitution of Each Part of the Battery Holder 10

Figure 2:
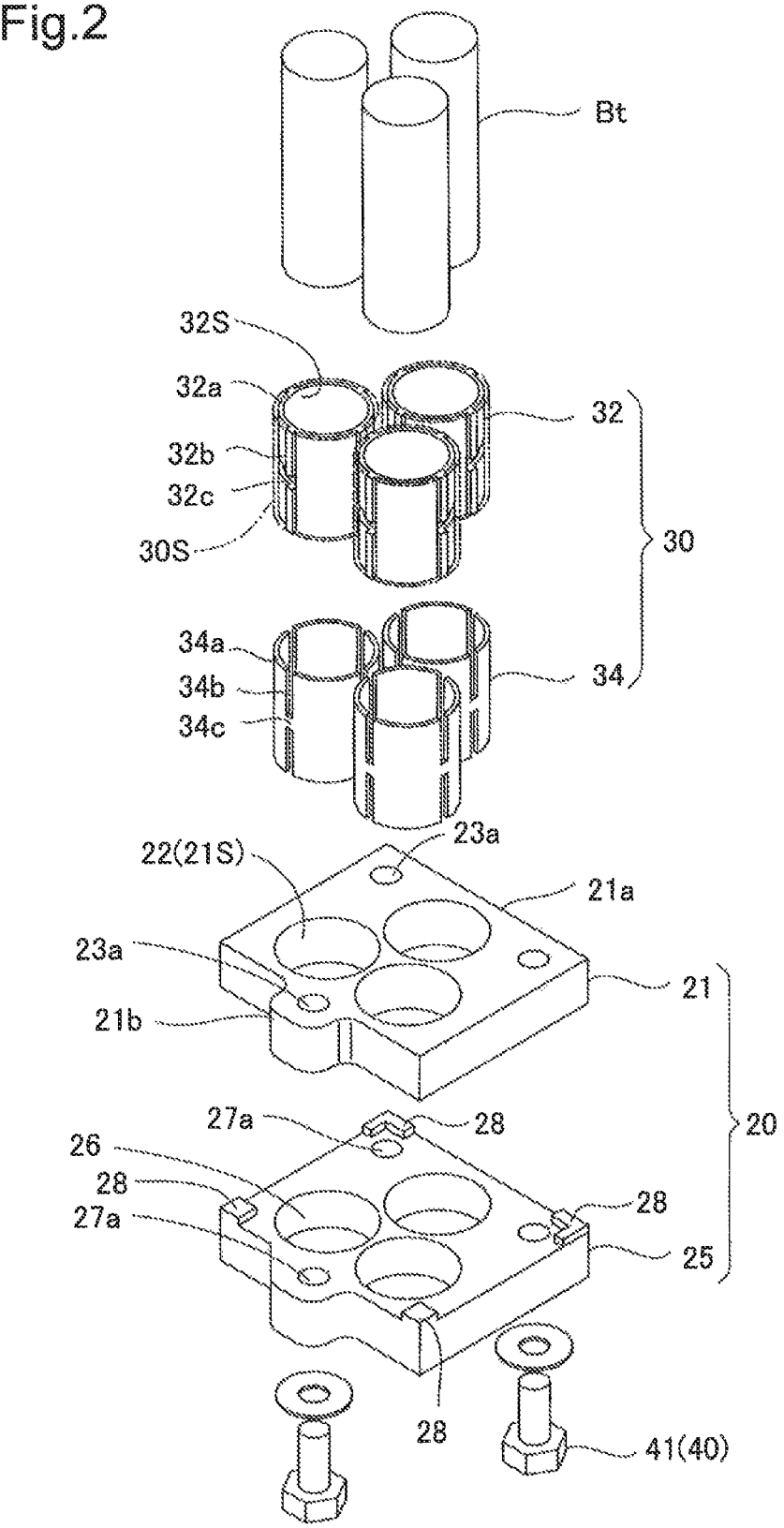
FIG. 2 is an exploded perspective view showing a battery holder.

FIG. 2 is an extended perspective view showing the battery holder 10. The support unit 20 is constituted by overlapping first and second blocks 21 and 25 and fastening them with bolts 41 of the fastening member 40. The first block 21 is formed from a metal material with high thermal conductivity such as aluminum, for example, and is equipped with an almost rectangular solid block main body 21a and a fastening projection 21b projecting out from the end part of the block main body 21a. First holding holes 22 constituting the battery holding hole 21S are formed piercing in three locations. The first holding holes 22 have a circular cross section shape, and are formed at an inner diameter for which fitting with the holder unit 30 is possible. The three first holding holes 22 are arranged in equilateral triangle form. Also, fastening holes 23a fastened by the bolts 41 are formed at the corners of the block main body 21a and at the fastening projecting part 21b. The second block 25 has the same shape as the first block 21, but the constitution by which gap forming projections 28 are formed is different. The gap forming projections 28 are respectively an L shaped are rectangular convex part formed on the top surface of the corners of the second block 25, and by contacting the opposite facing surface in the drawing of the first block 21, a gap Gp is formed with the first block 21 (FIG. 1).

The holder unit 30 is a member for respectively supporting the three batteries Bt, and is equipped with a first spacer 32 and a second spacer 34. The first spacer 32 is equipped with a round cylinder shaped core main body 32a. The core unit 32a is equipped with a fitting part 32S for fitting the battery Bt into the space inside the cylinder. Four support parts 32b are provided projecting at 90 degree intervals in the circumference direction at the outer circumference part of the core main body 32a.

Figure 3:
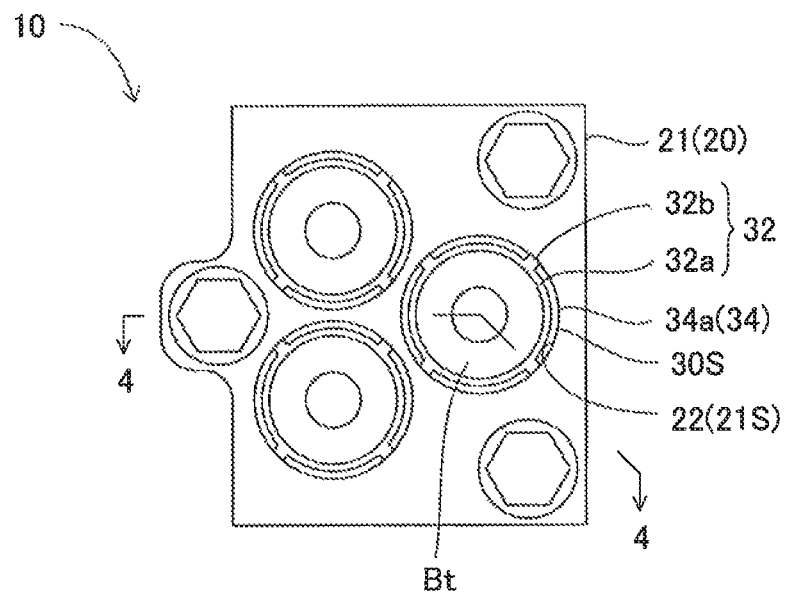
FIG. 3 is a plan view showing a battery holder seen from arrow 3 in FIG. 1.
Figure 4:
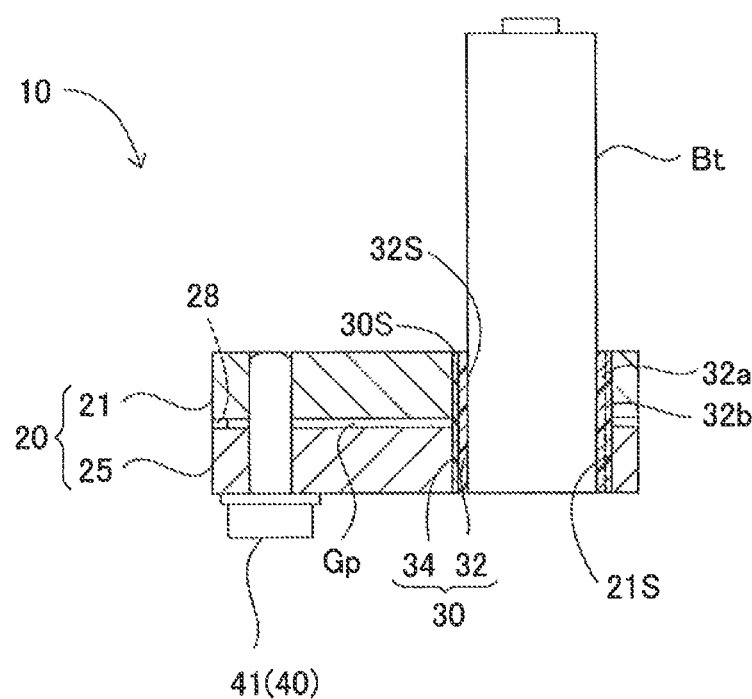
FIG. 4 is a cross section view along line 4-4 of FIG. 3, FIG. 5 describes the operation of the battery holder, FIG. 6 describes the operation of the battery holder, FIG. 7 describes the operation of the battery holder.

FIG. 3 is a plan view showing the battery holder 10 seen from the direction of arrow 3 in FIG. 1, and FIG. 4 is a cross section view along line 4-4 of FIG. 3. The support part 32b of the first spacer 32 supports the first spacer 32 on the support unit 20 by contacting the inner circumference surface of the battery holding hole 21S. With the support part 32b, a heat shielding space 30S is formed between the outer surface of the core main body 32a and the inner wall of the battery holding hole 21S. As shown in FIG. 2, with the center part of the support part 32b, the convex shape is cut to form a notch 32c, and the linking force with the second spacer 34 is increased as described later.

The first spacer 32 is formed of a heat curing resin material having heat resistance and electrical insulation properties. Specifically, the resin material has a heat resistance temperature of 200° C. or greater, and it is particularly preferable to be 400° C. or greater. Also, the electrical insulation property is $10^{10}$ Ωcm or greater. Also, the thermal conductivity is 0.2 $W \cdot m^{-1} \cdot K^{-1}$. As resin materials having this kind of heat resistance and electrical insulation properties, it is possible to use aromatic heat curing resins, such as polyimide (PI), polybenzimidazole (PBI), polybenzoxazole (PBO) or the like.

The second spacer 34 is equipped with a round cylinder shaped sub main unit 34a. The sub main unit 34a is interposed at the heat shielding space 30S between the first spacer 32 and the inner wall of the battery holding hole 21S. Eight slits 34b are provided projecting respectively from the vertical direction at 90 degree intervals in the circumference direction at the outer circumference part of the sub main unit 34a. Two of the slits 34b form a set in the vertical direction and are arranged in the same direction, and the area between the upper and lower slits 34b is the linking part 34c. By entering the support part 32b of the first spacer 32 into the slit 34b, and by further entering the linking part 34c in the notch 32c of the first spacer 32, the integration of the first spacer 32 and the second spacer 34 is increased, and by doing that, the linking force of the two items is increased.

The second spacer 34 is formed with a thermoplastic resin material. The resin material is formed with a material with a lower melting point than the resin material used for the first spacer 32, specifically, it is a material that melts at a temperature of 180° C. or less, and more preferably melts at a temperature of 160° C. or less. The second spacer 34 is formed from a material with higher thermal conductivity than that of the first spacer 32, for example 2 $W \cdot m^{-1} \cdot K^{-1}$. As a resin material with this kind of low melting point, it is possible to use polypropylene (PP), polyethylene (PE) or the like. As a method for increasing the resin thermal conductivity, it is possible to increase the thermal conductivity to be higher than with normal resin by having a high thermal conductivity agent contained in the resin, for example.

(3) Work of Assembling the Battery Holder 10

To assemble the batteries Bt with the battery holder 10 to make an integrated unit, the following work is performed. In FIG. 2, the first block 21 and the second block 25 are overlapped, and by putting three bolts 41 respectively through the fastening holes 23a and 27a and fastening, the support unit 20 is constituted with the first block 21 and the second block 25 as an integrated unit. Then, three of the second spacers 34 are respectively inserted in the three battery holding holes 21S of the support unit 20. Then, the batteries Bt are inserted inside the second spacers 34, and in the gap between the battery Bt and the second spacer 34, resin material for forming the first spacer 32 is filled. As the resin material, it is possible to use a heat resistant polyimide or the like as described above. Then, when the resin material is cured, the first spacer 32 is formed. Specifically, with the resin material, the round cylinder shaped core main body 32a is formed, and also, the support part 32b entered in the slit 34b is formed, and the first spacer 32 which is an integral unit with the second spacer 34 is formed. By doing this, the batteries Bt are held in the battery holder 10.

(4) Operation and Effect of the Battery Holder 10

(4)-1 The battery holder 10 can reliably hold a plurality of batteries Bt via the holder unit 30 in the support unit 20 with a simple constitution. Specifically, as shown in FIG. 3 and FIG. 4, the support part 32b of the first spacer 32 contacts the inner wall of the battery holding hole 21S, and supports the battery Bt in the support unit 20, and also, by having the second spacer 34 be closely adhered to the inner wall surface of the battery holding hole 21S, the holder unit 30 holds the battery Bt in the support unit 20.

(4)-2 Battery Temperature Rise of a Designated Level or Less

Figure 5:
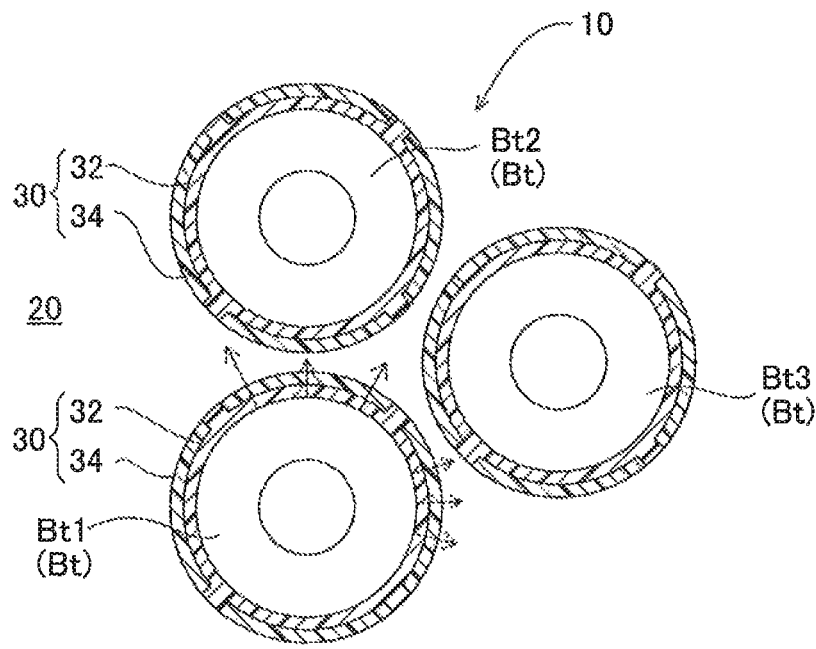

In FIG. 5, when the temperature of the batteries Bt held in the battery holder 10 rises, using the operation described below, the battery holder 10 is able to decrease the temperature of the plurality of batteries and to make the temperature uniform. Specifically, with use of a portion of the battery Bt1 (Bt), heat is emitted and the temperature rises. At this time, when the temperature of the second spacer 34 is the melting point of the resin material or lower, for example when it is 160° C. or less, that heat goes through the first spacer 32 and the second spacer 34 of the holder unit 30 and is transmitted to the support unit 20, and the heat is radiated mainly at the support unit 20. By doing this, the rise in the temperature of the batteries Bt and the battery holder 10 is suppressed. At this time, the first spacer 32 and the second spacer 34 of the holder unit 30 does not have a big difference occur with temperature distribution in relation to the support unit 20, so the heat of the battery Bt1 is gradually transmitted to the other batteries Bt2 and Bt3 via the holder unit 30, and the temperature of the plurality of batteries Bt becomes almost uniform. The life of the batteries Bt depends on that temperature, so for the plurality of the batteries Bt, it is possible to make their temperatures even, and to lengthen their life overall.

(4)-3 Battery Temperature Rise of a Designated Level or Greater

Figure 6:
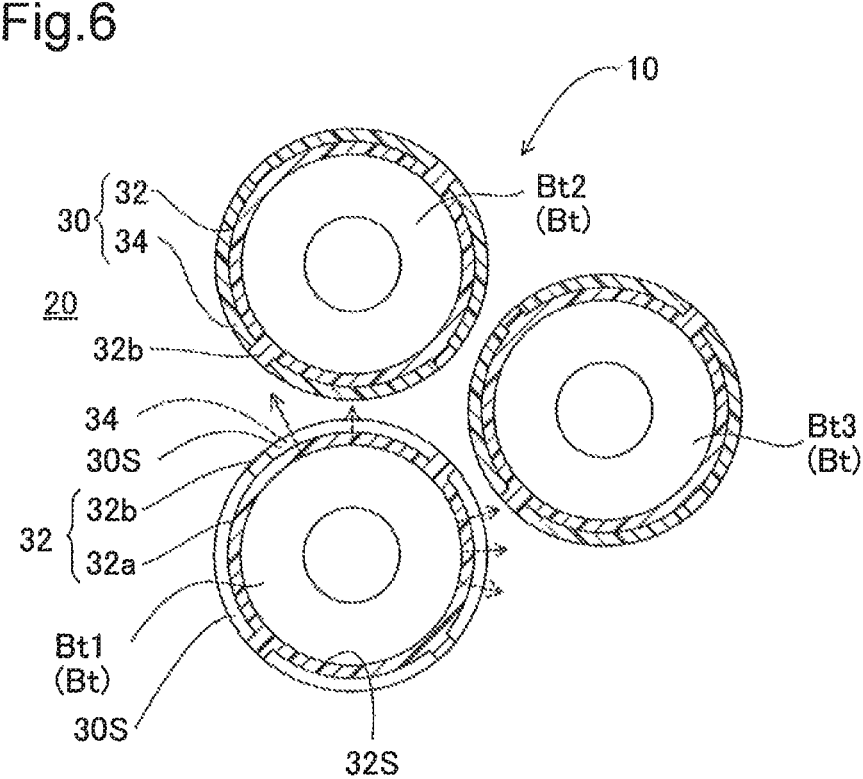
Figure 7:
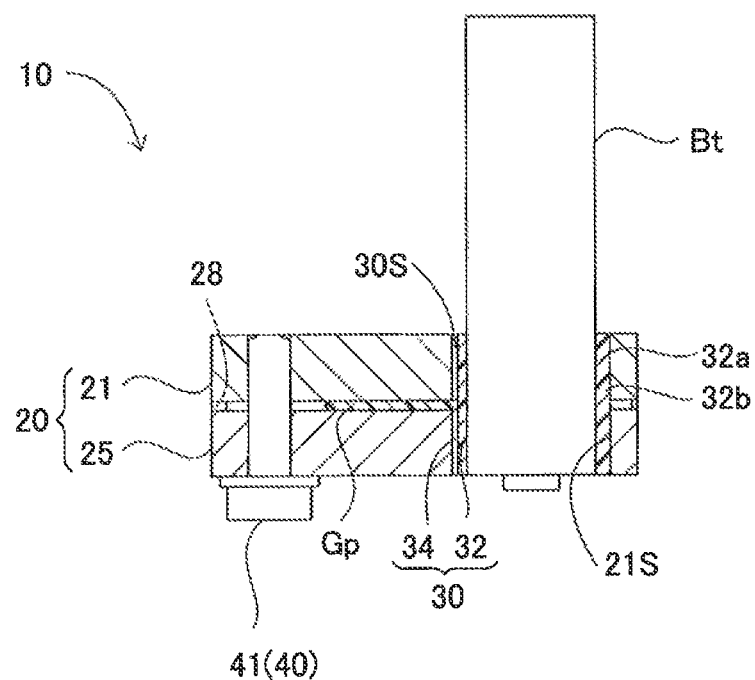

In FIG. 6, with use of a portion of the battery Bt1, heat is emitted and the temperature rises. At this time, when the temperature of the second spacer 34 is the melting point of the resin material or greater, for example when the temperature exceeds 160° C., the second spacer 34 melts. As shown in FIG. 7, the melted resin flows into the gap Gp from the outflow port formed between the first block 21 and the second block 25, and a gap is formed at the location where the second spacer 34 was. This gap acts as a heat insulation space with a high level of insulating performance. Therefore, even if the temperature of a portion of the battery Bt1 becomes very high, the heat migration to the other batteries Bt2 and Bt3 is suppressed by the insulation layer, and it is possible to prevent a big chain reaction rise in the temperature of the other batteries Bt.

At this time, even if the second spacer 34 melts, with the first spacer 32, its support part 32b contacts the inner wall of the battery holding hole 21S, and the battery Bt is supported firmly in the support unit 20, so the battery Bt will not fall out of the support unit 20. Also, the support part 32b of the first spacer 32 has only a portion formed protruding at a designated gap in the circumference direction from the outer circumference part of the core main body 32a, so it is possible to have the heat insulation space for which the insulation performance with the support part 32b is high and the battery is enclosed in a wide range in the circumference direction.

(4)-6 In FIG. 6, the second spacer 34 of the holder unit 30 is arranged so as to face the second spacer 34 of the adjacent holder unit 30, in other words, to avoid the support part 32b of the first spacer 32, so when the second spacer 34 melts, heat is not easily transmitted through the support part 32b, and the heat shielding performance level is high.

(4)-5 As shown in FIG. 4, the gap Gp formed between the first block 21 and the second block 25 constituting the support unit 20 is a space in which the melted resin flows for forming the heat insulation space when the second spacer 34 is melted by heat. As shown in FIG. 2, the space for promoting the formation of the heat insulation space is constituted simply by matching the first block 21 and the second block 25 as well as by the gap forming projection 28 formed on the second block 25.

(4)-6 As shown in FIG. 6, the core main body 32a of the first spacer 32 fits and supports the battery with the fitting part 32S, so even if the second spacer 34 melts and the heat insulation space is constituted, it is possible to hold the battery firmly.

(5) Other Embodiments

This invention is not limited to the aforementioned embodiments, and it can be implemented with various modes in a range that does not stray from its gist, so the following kinds of modification are possible, for example.

Figure 8:
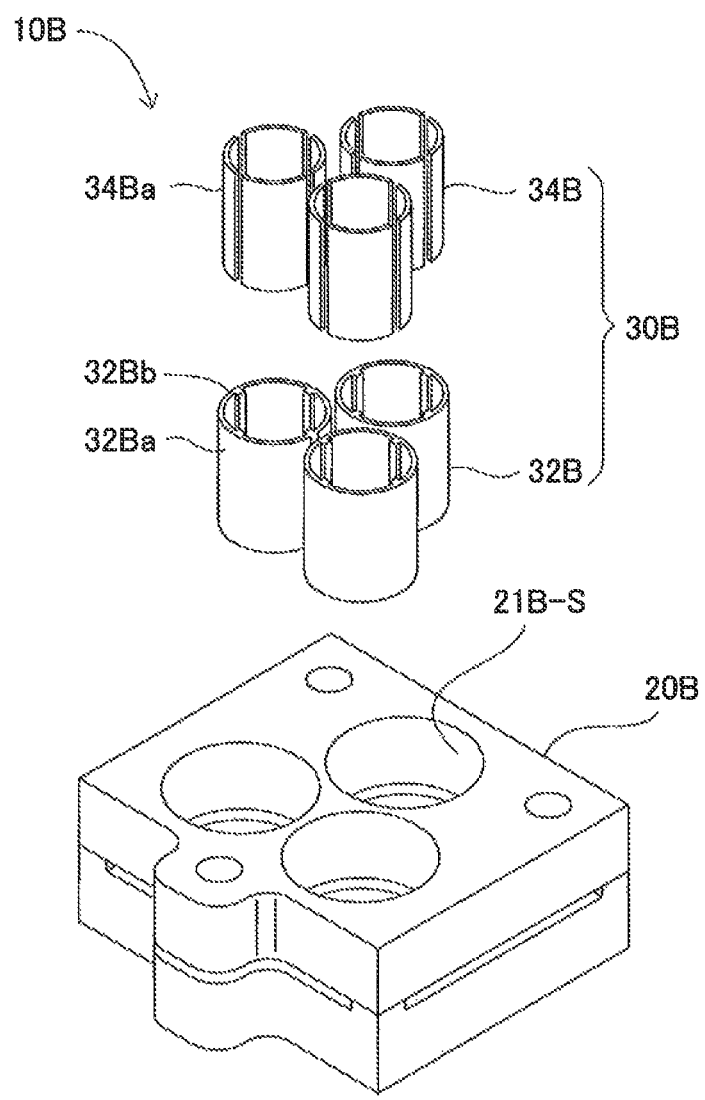
FIG. 8 is a perspective view showing a battery holder of the second embodiment.

(5)-1 FIG. 8 is a perspective view showing the battery holder 10B of the second embodiment. This embodiment has its characteristic feature in the constitution of the holder unit 30B. Specifically, the holder unit 30B is equipped with the first spacer 32B arranged at the outer circumference side inside the battery holding hole 21B-S of the support unit 20B, and the second spacer 34B arranged at its inner circumference side. The same as with the first embodiment, the second spacer 34B is formed using a resin material for which the melting point is lower than that of the first spacer 32B. The first spacer 32B is equipped with the round cylinder shaped core main body 32Ba and the protruding part 32Bb provided extending in the axis direction of the cylinder at the inner circumference side of the core main body 32Ba. The second spacer 34B is constituted from a dividing piece 34Ba with an arc shaped cross section for which the cylinder is evenly divided into four parts. The holder unit 30B is constituted by the dividing piece 34Ba being entered into the space constituted by the protruding part 32Bb of the first spacer 32B and the outer circumference surface of the battery.

With the battery holder 10B of this embodiment, even if the temperature of a portion of the batteries becomes high, when the temperature of the second spacer 34B is the melting point of its material or lower, the heat of the battery is gradually transmitted through the second spacer 34B and the first spacer 32B to the support unit 20B. By doing this, the temperature of the other batteries is almost the same temperature, and heat radiation occurs mainly at the support unit 20B. Thus, a rise in the temperature of a portion of the batteries is suppressed.

Also, when the temperature of a portion of the batteries increases and the temperature of the second spacer 34B exceeds the melting point of its material, the second spacer 34B melts, and this acts as the heat insulation space with a high level of insulating performance. In this way, even when one battery exceeds a designated temperature, with the insulating layer, the other batteries are not greatly affected by heat, and a chain reaction rise in temperature does not easily occur.

(5)-2 With the aforementioned embodiments, a constitution was described with the first spacer 32 and the support part 32b formed in the axis direction of the cylindrical core main body 32a, but the invention is not limited to this, and any position or shape is acceptable as long as an operation is exhibited of the support part 32b supporting the batteries in the battery holding holes 21S.

(5)-3 With the aforementioned embodiments, we described a constitution for which a plurality of batteries are arranged in an equilateral triangle, but the invention is not limited to this, and it is possible to use various arrangements, such as arranging the plurality of batteries in a grid form, arranging the battery gap to be as small as possible to save space, or the like.

(5)-4 With the aforementioned embodiments, we described a constitution for which the battery holder holds one end part of the battery, but the invention is not limited to this, and it is also possible to have a constitution for which the other end or a plurality of locations of the battery are supported.

(5)-5 With the aforementioned embodiments, we described a round pillar shaped type battery, but the invention is not limited to this, and it is possible to use rectangular or button type batteries or the like as long as the action and effects are not lost.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A battery holder for holding a plurality of batteries, the holder comprising:
   a support unit having battery holding holes for inserting each battery, and
   a holder unit interposed between an outer surface of the battery and an inner surface of the battery holding hole for supporting the battery in the support unit,
   wherein the holder unit includes a first spacer and a second spacer interposed to be laminated between the battery and the battery holding hole, wherein
   the first spacer is made of a first material, and has a support part for supporting the battery in the support unit so as to form a heat shielding space between the outer surface of the battery and the inner wall of the battery holding hole, and
   the second spacer is made of a second material that has a lower melting point than the melting point of the first material, and inserted in the heat shielding space, wherein the second spacer is configured to form a heat insulation space when the second spacer melts by heat, and flows out from the heat shielding space.

2. The battery holder according to claim 1 wherein
   the first spacer includes a round cylinder shaped core main body for fitting and holding the battery,
   the second spacer is laminated on an outer circumference surface of the core main body and is arranged so as to contact the inner wall of the battery holding hole, and
   the support part projects from the outer circumference surface of the core main body, and abuts the inner wall of the battery holding hole.

3. The battery holder according to claim 2 wherein
   the second spacer includes a slit fitted to the support part.

4. The battery holder according to claim 3 wherein
   the support part is a protrusion that projects along the axis direction of the core main body.

5. The battery holder according to claim 4 wherein
   the thermal conductivity of the second material is higher than the thermal conductivity of the first material.

6. The battery holder according to claim 5 wherein
   the support unit includes first and second blocks that form the battery holding hole, wherein
   the first block and the second block form a gap such that at least part of the melted material of the second spacer flows into, thereby the second spacer forming the heat insulation space.

7. The battery holder according to claim 1 wherein
   the thermal conductivity of the second material is higher than the thermal conductivity of the first material.

8. The battery holder according to claim 1 wherein
   the support unit includes first and second blocks that form the battery holding hole, wherein
   the first block and the second block form a gap such that at least part of the melted material of the second spacer flows into, thereby the second spacer forming the heat insulation space.

9. The battery holder according to claim 1 wherein
   the first spacer includes a round cylinder shaped core main body to be fit in the inner wall of the battery holding hole,
   the second spacer is laminated on the inner circumference surface of the core main body, and arranged so as to contact the outer surface of the battery, and
   the support part projects from the inner circumference surface of the core main body, and abuts the outer surface of the battery.

10. The battery holder according to claim 9 wherein
    the second spacer includes a slit fitted to the support part.

11. The battery holder according to claim 10 wherein
    the support part is a protrusion that projects along the axis direction of the core main body.

12. The battery holder according to claim 11 wherein
    the thermal conductivity of the second material is higher than the thermal conductivity of the first material.

13. The battery holder according to claim 12 wherein
    the support unit includes first and second blocks that form the battery holding hole, wherein
    the first block and the second block form a gap such that at least part of the melted material of the second spacer flows into, thereby the second spacer forming the heat insulation space.

14. The battery holder according to claim 9 wherein
    the support unit includes first and second blocks that form the battery holding hole, wherein
    the first block and the second block form a gap such that the melted material of the second spacer flows into, the second spacer forming the heat insulation space.

15. The battery holder according to claim 9 wherein
    the thermal conductivity of the second material is higher than the thermal conductivity of the first material.

* * * * *